United States Patent
Yamakawa et al.

[19]

[11] Patent Number: 5,956,295
[45] Date of Patent: *Sep. 21, 1999

[54] MAGNETO-OPTICAL DISK DRIVE SUPPORTING A DIRECT-OVER-WRITE OPERATION AND A WRITE-AFTER-ERASE OPERATION

[75] Inventors: Teruji Yamakawa, Yokohama; Kiyomi Ogino; Takehiko Numata, both of Kawasaki, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,483

[22] Filed: Jun. 26, 1996

[30] Foreign Application Priority Data

Jul. 10, 1995 [JP] Japan ................................. 7-207302

[51] Int. Cl.⁶ ................................................ G11B 11/00
[52] U.S. Cl. ............................................ 369/13; 369/116
[58] Field of Search ............................... 369/13, 116, 58, 369/54, 14; 360/59, 114; 365/122

[56] References Cited

U.S. PATENT DOCUMENTS

| 4,882,718 | 11/1989 | Kryder et al. | 369/13 |
| 5,155,719 | 10/1992 | Masakawa . | |
| 5,202,863 | 4/1993 | Miyatake et al. | 369/13 |
| 5,276,665 | 1/1994 | Aoki et al. | 369/58 |
| 5,475,666 | 12/1995 | Ito et al. | 369/116 |
| 5,544,137 | 8/1996 | Ohara et al. | 369/116 |
| 5,553,044 | 9/1996 | Tanaka . | |
| 5,557,589 | 9/1996 | Mukawa et al. | 369/13 |
| 5,579,294 | 11/1996 | Ohta et al. | 369/58 |
| 5,639,567 | 6/1997 | Challener, IV | 428/694 ML |

*Primary Examiner*—Tan Dinh
*Attorney, Agent, or Firm*—Staas & Halsey

[57] ABSTRACT

A magneto-optical recording system which is compatible the write-after-erase magneto-optical media and the directly-over-write magneto-optical media. The magneto-optical recording system provided by the present invention includes a detector used for detecting the type of the medium and a controller coupled to the detector and controlling a write-after-erase operation or a direct-over-write operation with respect to the medium responsive to the medium type.

7 Claims, 20 Drawing Sheets

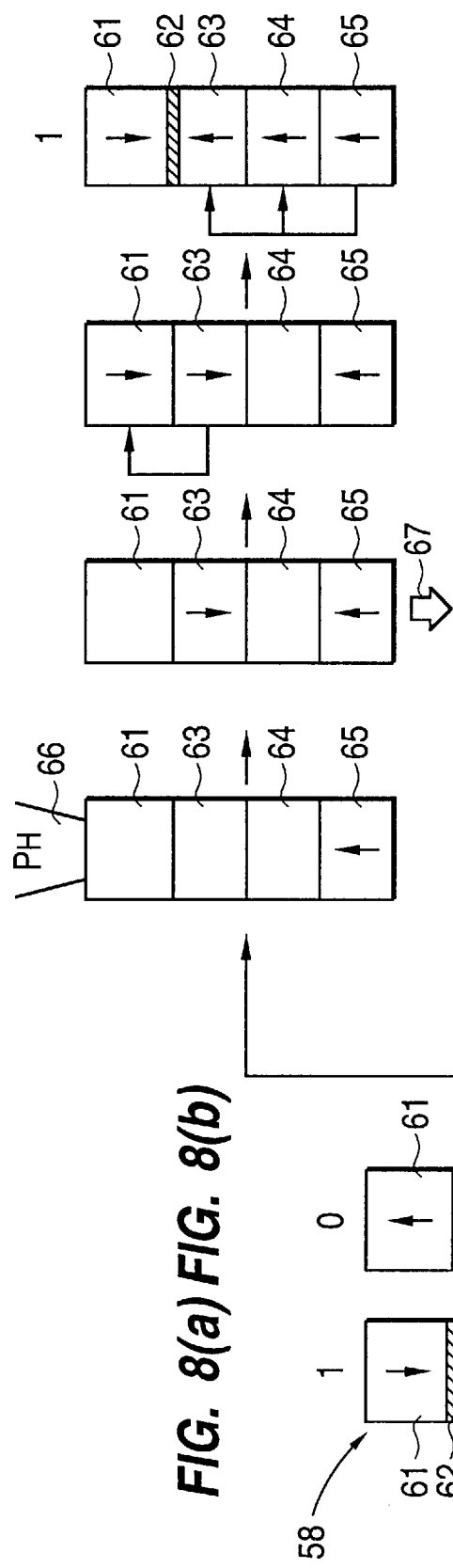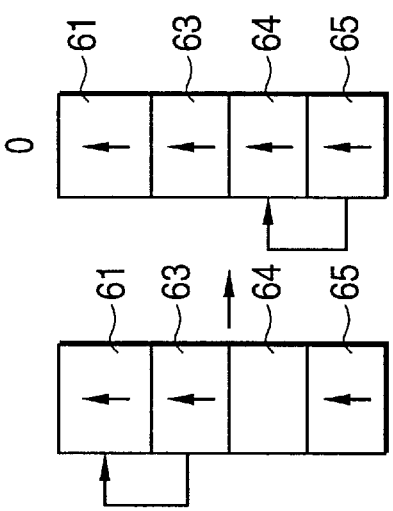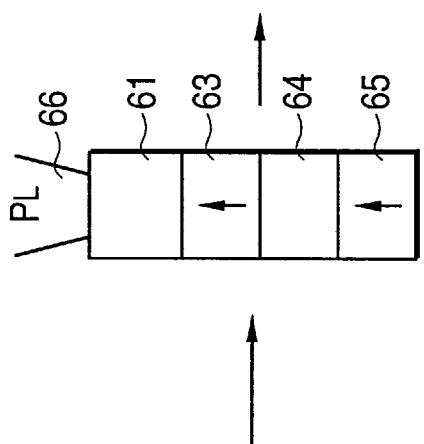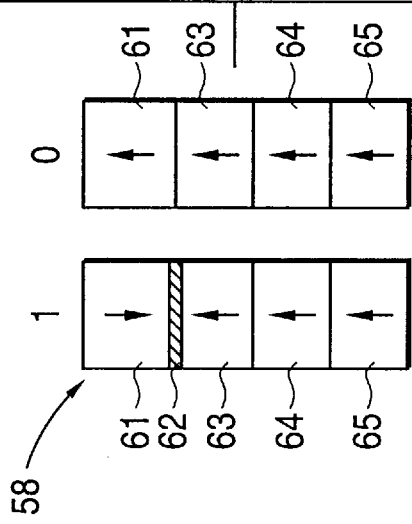

FIG. 11(a) DAC3 (READ CURRENT)
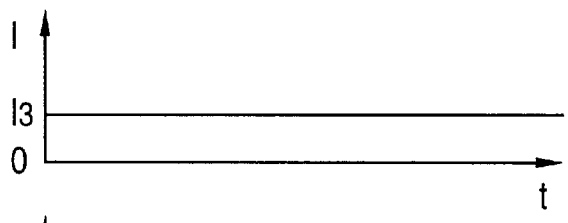
FIG. 11(b) HFM
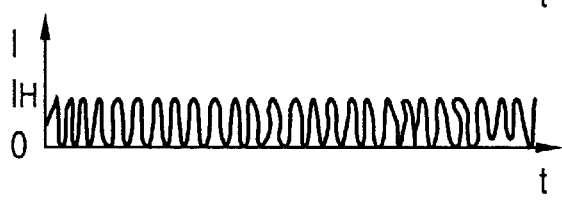
FIG. 11(c) LD
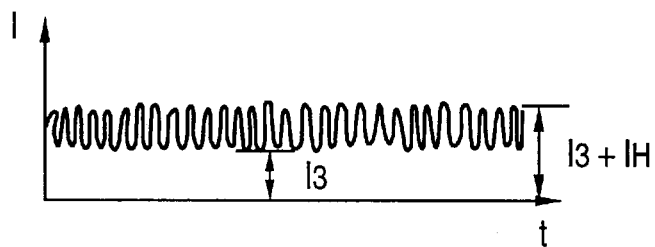
FIG. 11(d) PD
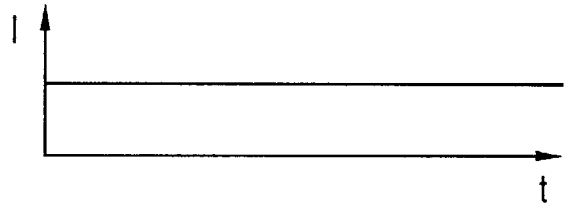
FIG. 11(e) PDMON (APC)
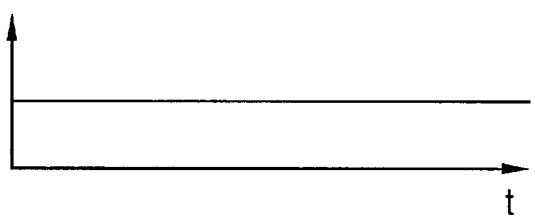

FIG. 12(a) WRITE GATE
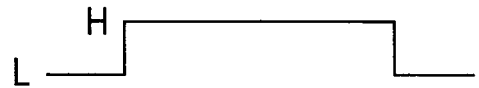
FIG. 12(b) WRITE DATA
FIG. 12(c) DAC3 / SW3b (READ CURRENT)
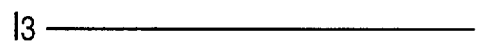
FIG. 12(d) HFM
FIG. 12(e) DAC6/SW6a (HFM COMPENSATING CURRENT)
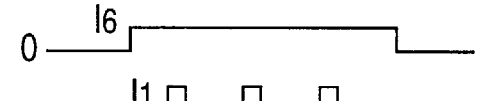
FIG. 12(f) DAC1/SW1a (WRITE PULSE)
FIG. 12(g) LD
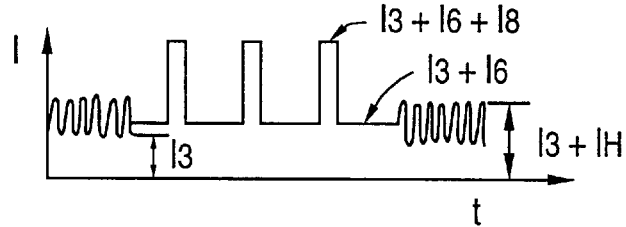
FIG. 12(h) PD
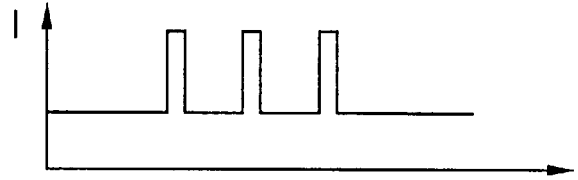
FIG. 12(i) DAC4/SW4a (WRITE PULSE SUBTRACTING CURRENT)
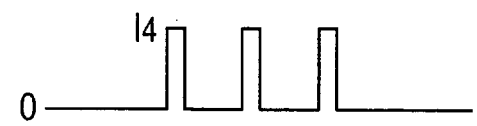
FIG. 12(j) PDMON (APC)
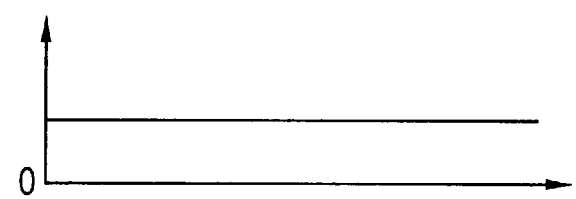

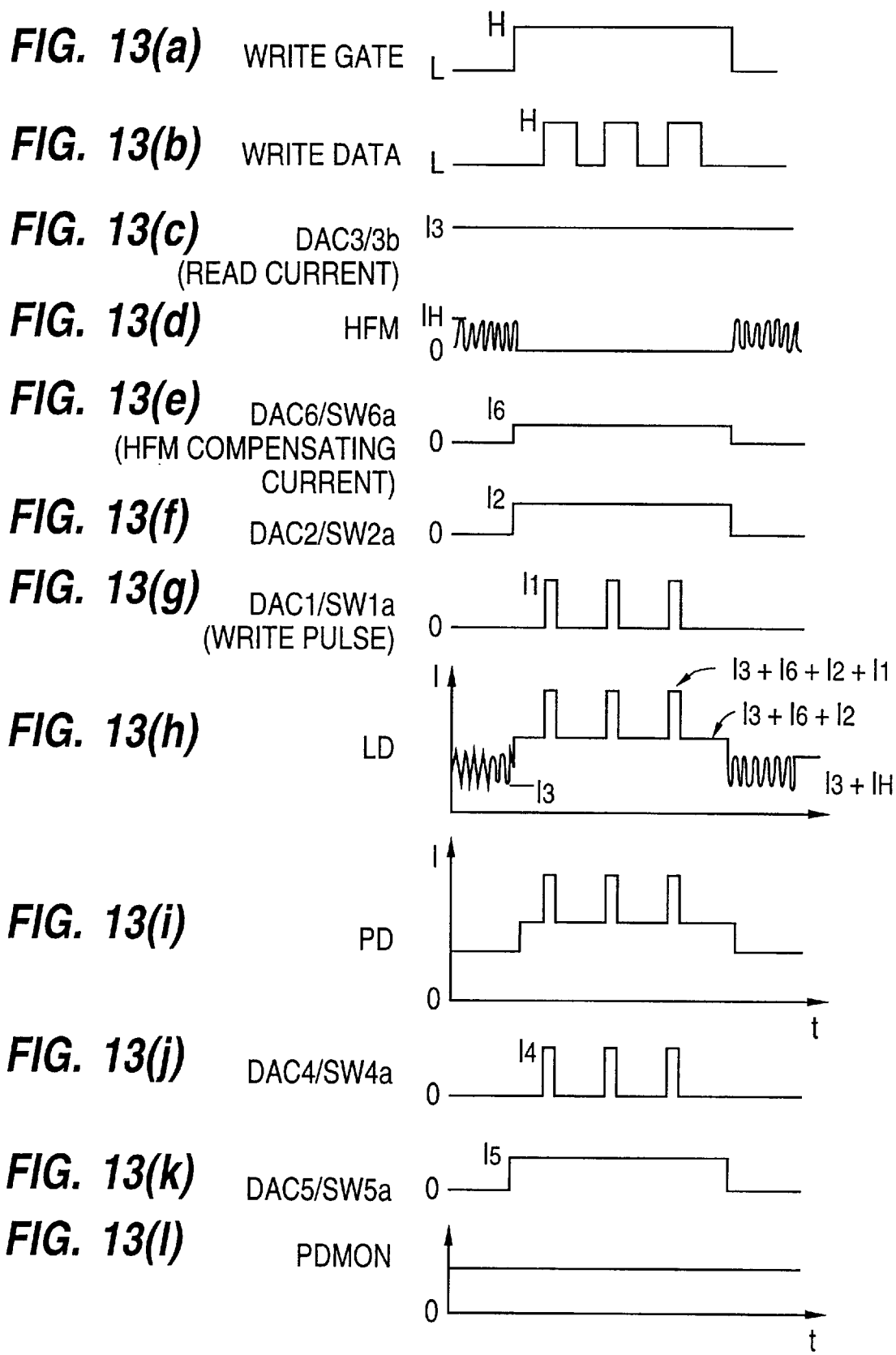

FIG. 17

| |
|---|
| RECORDING TYPE (ZONE RECORDING OR NOT) |
| RECORDING TYPE (MARK EDGE OR MARK POSITION) |
| RECORDING TYPE (LAND OR GROOVE RECORDING) |
| MEDIUM TYPE |
| WRITE CONDITION |
| ERASE CONDITION |
| READ CONDITION |
| ⋮ |

FIG. 18

| ZONE | | TARGET LASER POWER (MO TYPE) | | | | |
|---|---|---|---|---|---|---|
| | | 0-8°C | 8-15°C | 15-30°C | 30-45°C | 45-60°C |
| 0 | PW | PW00 mW | PW01 mW | PW03 mW | PW04 mW | PW05 mW |
| | PE | PE00 mW | PE01 mW | PE03 mW | PE04 mW | PE05 mW |
| 1 | PW | PW10 mW | PW11 mW | PW13 mW | PW14 mW | PW15 mW |
| | PE | PE10 mW | PE11 mW | PE13 mW | PE14 mW | PE15 mW |
| 2 | PW | PW20 mW | PW21 mW | PW23 mW | PW24 mW | PW25 mW |
| | PE | PE20 mW | PE21 mW | PE23 mW | PE24 mW | PE25 mW |
| 3 | PW | PW30 mW | PW31 mW | PW33 mW | PW34 mW | PW35 mW |
| | PE | PE30 mW | PE31 mW | PE33 mW | PE34 mW | PE35 mW |
| 4 | PW | PW40 mW | PW41 mW | PW43 mW | PW44 mW | PW45 mW |
| | PE | PE40 mW | PE41 mW | PE43 mW | PE44 mW | PE45 mW |
| 5 | PW | PW50 mW | PW51 mW | PW53 mW | PW54 mW | PW55 mW |
| | PE | PE50 mW | PE51 mW | PE53 mW | PE54 mW | PE55 mW |
| 6 | PW | PW60 mW | PW61 mW | PW63 mW | PW64 mW | PW65 mW |
| | PE | PE60 mW | PE61 mW | PE63 mW | PE64 mW | PE65 mW |
| 7 | PW | PW70 mW | PW71 mW | PW73 mW | PW74 mW | PW75 mW |
| | PE | PE70 mW | PE71 mW | PE73 mW | PE74 mW | PE75 mW |
| 8 | PW | PW80 mW | PW81 mW | PW83 mW | PW84 mW | PW85 mW |
| | PE | PE80 mW | PE81 mW | PE83 mW | PE84 mW | PE85 mW |
| 9 | PW | PW90 mW | PW91 mW | PW93 mW | PW94 mW | PW95 mW |
| | PE | PE90 mW | PE91 mW | PE93 mW | PE94 mW | PE95 mW |

FIG. 19

| ZONE | | TARGET LASER POWER (DOW TYPE) | | | | |
|---|---|---|---|---|---|---|
| | | 0-8°C | 8-15°C | 15-30°C | 30-45°C | 45-60°C |
| 0 | PH | PH00 mW | PH01 mW | PH03 mW | PH04 mW | PH05 mW |
|   | PL | PL00 mW | PL01 mW | PL03 mW | PL04 mW | PL05 mW |
| 1 | PH | PH10 mW | PH11 mW | PH13 mW | PH14 mW | PH15 mW |
|   | PL | PL10 mW | PL11 mW | PL13 mW | PL14 mW | PL15 mW |
| 2 | PH | PH20 mW | PH21 mW | PH23 mW | PH24 mW | PH25 mW |
|   | PL | PL20 mW | PL21 mW | PL23 mW | PL24 mW | PL25 mW |
| 3 | PH | PH30 mW | PH31 mW | PH33 mW | PH34 mW | PH35 mW |
|   | PL | PL30 mW | PL31 mW | PL33 mW | PL34 mW | PL35 mW |
| 4 | PH | PH40 mW | PH41 mW | PH43 mW | PH44 mW | PH45 mW |
|   | PL | PL40 mW | PL41 mW | PL43 mW | PL44 mW | PL45 mW |
| 5 | PH | PH50 mW | PH51 mW | PH53 mW | PH54 mW | PH55 mW |
|   | PL | PL50 mW | PL51 mW | PL53 mW | PL54 mW | PL55 mW |
| 6 | PH | PH60 mW | PH61 mW | PH63 mW | PH64 mW | PH65 mW |
|   | PL | PL60 mW | PL61 mW | PL63 mW | PL64 mW | PL65 mW |
| 7 | PH | PH70 mW | PH71 mW | PH73 mW | PH74 mW | PH75 mW |
|   | PL | PL70 mW | PL71 mW | PL73 mW | PL74 mW | PL75 mW |
| 8 | PH | PH80 mW | PH81 mW | PH83 mW | PH84 mW | PH85 mW |
|   | PL | PL80 mW | PL81 mW | PL83 mW | PL84 mW | PL85 mW |
| 9 | PH | PH90 mW | PH91 mW | PH93 mW | PH94 mW | PH95 mW |
|   | PL | PL90 mW | PL91 mW | PL93 mW | PL94 mW | PL95 mW |

FIG. 20

| ZONE | | SETTING VALUE OF DAC'S (MO TYPE) | | | | |
|---|---|---|---|---|---|---|
| | | 0 - 8°C | 8 - 15°C | 15 - 30°C | 30 - 45°C | 45 - 60°C |
| 0 | DAC1<br>DAC4 | A100<br>A400 | A101<br>A401 | A102<br>A402 | A103<br>A403 | A104<br>A404 |
| 1 | DAC1<br>DAC4 | A110<br>A410 | A111<br>A411 | A112<br>A412 | A113<br>A413 | A114<br>A414 |
| 2 | DAC1<br>DAC4 | A120<br>A420 | A121<br>A421 | A122<br>A422 | A123<br>A423 | A124<br>A424 |
| 3 | DAC1<br>DAC4 | A130<br>A430 | A131<br>A431 | A132<br>A432 | A133<br>A433 | A134<br>A434 |
| 4 | DAC1<br>DAC4 | A140<br>A440 | A141<br>A441 | A142<br>A442 | A143<br>A443 | A144<br>A444 |
| 5 | DAC1<br>DAC4 | A150<br>A450 | A151<br>A451 | A152<br>A452 | A153<br>A453 | A154<br>A454 |
| 6 | DAC1<br>DAC4 | A160<br>A460 | A161<br>A461 | A162<br>A462 | A163<br>A463 | A164<br>A464 |
| 7 | DAC1<br>DAC4 | A170<br>A470 | A171<br>A471 | A172<br>A472 | A173<br>A473 | A174<br>A474 |
| 8 | DAC1<br>DAC4 | A180<br>A480 | A181<br>A481 | A182<br>A482 | A183<br>A483 | A184<br>A484 |
| 9 | DAC1<br>DAC4 | A190<br>A490 | A191<br>A491 | A192<br>A492 | A193<br>A493 | A194<br>A494 |

FIG. 21

| ZONE | | SETTING VALUE OF DAC'S (DOW TYPE) | | | | |
|---|---|---|---|---|---|---|
| | | 0 - 8°C | 8 - 15°C | 15 - 30°C | 30 - 45°C | 45 - 60°C |
| 0 | DAC1<br>DAC2<br>DAC4<br>DAC5 | B100<br>B200<br>B400<br>B500 | B101<br>B201<br>B401<br>B501 | B102<br>B202<br>B402<br>B502 | B103<br>B203<br>B403<br>B503 | B104<br>B204<br>B404<br>B504 |
| 1 | DAC1<br>DAC2<br>DAC4<br>DAC5 | B110<br>B210<br>B410<br>B510 | B111<br>B211<br>B411<br>B511 | B112<br>B212<br>B412<br>B512 | B113<br>B213<br>B413<br>B513 | B114<br>B214<br>B414<br>B514 |
| 2 | DAC1<br>DAC2<br>DAC4<br>DAC5 | B120<br>B220<br>B420<br>B520 | B121<br>B221<br>B421<br>B521 | B122<br>B222<br>B422<br>B522 | B123<br>B223<br>B423<br>B523 | B124<br>B224<br>B424<br>B524 |
| 3 | DAC1<br>DAC2<br>DAC4<br>DAC5 | B130<br>B230<br>B430<br>B530 | B131<br>B231<br>B431<br>B531 | B132<br>B232<br>B432<br>B532 | B133<br>B233<br>B433<br>B533 | B134<br>B234<br>B434<br>B534 |
| 4 | DAC1<br>DAC2<br>DAC4<br>DAC5 | B140<br>B240<br>B440<br>B540 | B141<br>B241<br>B441<br>B541 | B142<br>B242<br>B442<br>B542 | B143<br>B243<br>B443<br>B543 | B144<br>B244<br>B444<br>B544 |
| 5 | DAC1<br>DAC2<br>DAC4<br>DAC5 | B150<br>B250<br>B450<br>B550 | B151<br>B251<br>B451<br>B551 | B152<br>B252<br>B452<br>B552 | B153<br>B253<br>B453<br>B553 | B154<br>B254<br>B454<br>B554 |
| 6 | DAC1<br>DAC2<br>DAC4<br>DAC5 | B160<br>B260<br>B460<br>B560 | B161<br>B261<br>B461<br>B561 | B162<br>B262<br>B462<br>B562 | B163<br>B263<br>B463<br>B563 | B164<br>B264<br>B464<br>B564 |
| 7 | DAC1<br>DAC2<br>DAC4<br>DAC5 | B170<br>B270<br>B470<br>B570 | B171<br>B271<br>B471<br>B571 | B172<br>B272<br>B472<br>B572 | B173<br>B273<br>B473<br>B573 | B174<br>B274<br>B474<br>B574 |
| 8 | DAC1<br>DAC2<br>DAC4<br>DAC5 | B180<br>B280<br>B480<br>B580 | B181<br>B281<br>B481<br>B581 | B182<br>B282<br>B482<br>B582 | B183<br>B283<br>B483<br>B583 | B184<br>B284<br>B484<br>B584 |
| 9 | DAC1<br>DAC2<br>DAC4<br>DAC5 | B190<br>B290<br>B490<br>B590 | B191<br>B291<br>B491<br>B591 | B192<br>B292<br>B492<br>B592 | B193<br>B293<br>B493<br>B593 | B194<br>B294<br>B494<br>B594 |

MAGNETO-OPTICAL DISK DRIVE SUPPORTING A DIRECT-OVER-WRITE OPERATION AND A WRITE-AFTER-ERASE OPERATION

BACKGROUND OF THE INVENTION

1. Field of the Invention

The present invention relates to the field of magneto-optical recording systems such as a magneto-optical disk drive and, more specifically, to a system compatible with different types of magnetic-optical media, particularly a write-after-erase type and a direct-over-write type.

2. Description of the Related Art

Magneto-optical disk drives are devices for recording/reproducing data to/from magneto-optical media using a laser beam and are widely used as a peripheral storage devices for computers. A magneto-optical disk cartridge can be inserted into and removed from the magneto-optical disk drive and accommodates therein a rewritable magneto-optical disk medium. Cartridges that comply with the ISO standard and store R8 or 230 megabytes (MB) in 3.5 inch magneto-optical disk cartridges are widely used. Such cartridges are only slightly thicker than conventional 3.5 inch floppy disks, but hold up to 160 times the data. Moreover, such cartridges complying with ISO standard for a 640 MB magneto-optical disk cartridge are currently being discussed. Magneto-optical disk cartridges are expected to further expand their memory capacity.

The typical magneto-optical disk media includes a single magnetic layer on the substrate. Data is stored in the disk by local magnetization of the magnetic layer. The disk drive records data using a laser beam and a magnetic field. The laser beam when set at a relatively high power for recording heats the magnetic layer up to a temperature higher than the Curie point of the material of the media, and the magnetic field can flip or change the state of a small region where the magnetic layer is heated to a higher temperature than the Curie point. The disk drive reproduces data using a laser beam and a photo sensor. The photo sensor detects the laser beam reflected from the medium and polarized by the Kerr effect of the magnetic layer. Such a medium is disclosed, for example, in the Japanese Patent Laid-open No. SHO 58-73746.

Typical magneto-optical disk drives are classified into two types based on recording method: magnetic modulation recording and optical modulation recording. In the magnetic modulation recording method the direction of the magnetic field can be changed based on the input data. Data is recorded by continually irradiating the media the laser beam at write power level (a Curie power level) and by selectively changing the direction of the magnetic field in the media responsive to data to be written. This recording method has an advantage in that the disk drive directly can overwrite the data on the disk but has a disadvantage in that the disk drive cannot perform the overwrite at high speed because it is difficult to manufacture an electromagnet which is sufficiently compact, at a reasonable cost and which allows high speed operation.

In the optical modulation recording method the disk drive changes the power level of the laser beam responsive to data to be written. Initialization data (erase data) that sets the magnetic media to a known state is first recorded by continually applying a magnetic field to the media having a first direction and continually irradiating media with a laser beam at an erase power level (a Curie power level). Then, data to be written is recorded by continually applying a magnetic field having a second direction to the media and selectively irradiating the media with the laser beam at a write power (a Curie power level) responsive to the data. The advantage of this recording method is that the disk drive can erase data or write data at high speed because it is possible to change the power level of the laser beam faster than it is possible to change the direction of the magnetic field. The disadvantage is that the disk drive uses a two process of erasing and writing. However, this disadvantage has been reduced somewhat by using a write-cache memory for this type of drive.

A still newer type of media has been recently proposed called a direct-over-write. This newer direct-over-write media of the optical modulation recording type has been recently proposed but has not yet reached the commercial market. Data is directly over-written by continually applying a magnetic field having a predetermined direction to the media and by selectively irradiating the media with a laser having one of a first write power level and a second write power level responsive to the data to be written. Such a medium is disclosed, for example, in the Japanese Patent Laid-Open Nos. SHO 63-268103 and HEI 4-192135.

SUMMARY OF THE INVENTION

It is an object of the present invention to provide a novel magneto-optical recording system which is compatible with the typical magneto-optical media (write-after-erase media) and a new directly over-writable magneto-optical media (direct-over-write media).

It is another object of the present invention to provide a compact size and light weight magneto-optical recording system compatible with the old and newer types. In general, an implementation of a compatible results in a larger device. However, it is very important to reduce the size and the weight of the disk recording system to allows it to be included in a personal computer and, especially, a notebook personal computer.

It is a further object of the present invention to provide a novel recording circuit which minimizes the increase the number of circuits required for to implement of the multiple media type compatibility.

It is a still further object of the present invention to provide a recording circuit which implements both the multi type compatibility and provides optical power adjustment.

A magneto-optical recording system which attains the above-discussed objects in accordance with the present invention includes a detector detecting a type of the medium and a controller coupled to the detector and controlling a write-after-erase operation or a direct-over-write operation with respect to the medium responsive to the type. Such a magneto-optical recording system includes a laser diode producing a laser beam irradiating the medium, a detector detecting whether the medium is a write-after-erase medium or a direct-over-write medium, a first power supply coupled to and for supplying to the laser diode a first power level, a first switch between to the first power supplier and the diode, and turned on/off responsive to write data, a second power supply coupled to and for supplying to the laser diode a second power level, a second switch between the laser diode and the second power supply turned off during a write operation for a write-after-erase medium and turned on during a write operation for a direct-over-write medium, and a third power supply coupled to and supplying a third power level to the laser diode.

According to further features of the invention, the magneto-optical recording system includes a memory storing power level adjustment information and a controller coupled to the first, second and third power supplies and the memory, and controlling the power levels of the first, second and third power level suppliers.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 8(a) and 8(b) are respectively schematic views of illustrating a state of the magnetic layers 61–65 storing "1" and "0".

FIGS. 8(c)–8(f) are schematic views illustrating the direct-over-write operation of "1".

FIGS. 8(g)–8(i) are schematic views illustrating the direct-over-write operation of "0".

FIGS. 11(a)–11(e) are wave form diagrams illustrating the read operation in the write circuit 77 of FIG. 10.

FIGS. 12(a)–12(j) are wave form diagrams illustrating the write-after-erase operation in the write circuit 77 of FIG. 10.

FIGS. 13(a)–13(l) are wave form diagrams for explaining the direct-over-write operation of the write circuit 77 of FIG. 10.

FIG. 17 is a data structure of the control track and the information on the control track of the magneto-optical medium.

FIG. 18 is a data structure or table of target laser power for the write-after-erase medium.

FIG. 19 is a data structure or table of target laser power for the direct-over-write medium.

FIG. 20 is a data structure or table of the parameters of the write circuit for the write-after-erase operation.

FIG. 21 is a data structure or table of the parameters of the write circuit for the direct-over-write operation.

DESCRIPTION OF THE PREFERRED EMBODIMENTS

Figure 1:
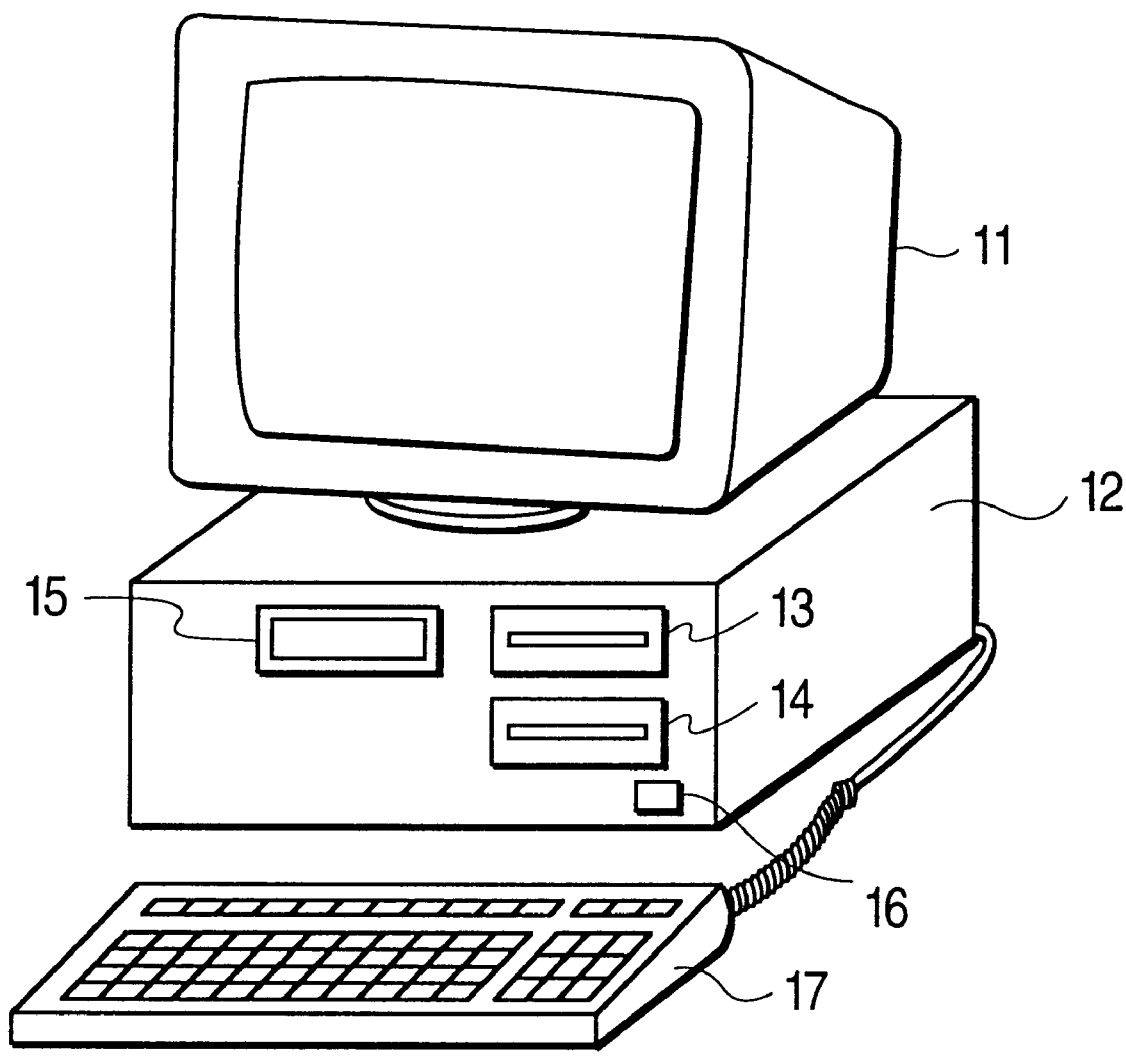
FIG. 1 is a perspective view of a personal computer 10.

FIG. 1 is a perspective view of a personal computer 10. In FIG. 1, the personal computer 10 mainly includes a display 11, a cabinet or main body 12 and a keyboard 17. The main body 12 holds a floppy disk drive 13, a magneto-optical disk drive 14, a CD-ROM drive 15 and a internal magnetic hard disk drive (not illustrated) as well as the MPU, RAM, etc. These storage devices, except the magnetic hard disk drive, use a portable (removable) medium and allow a part of the mechanism for inserting and ejecting the medium to be exposed to the outside. The personal computer 10 is started with a power switch 16 and reads operation system and application instructions from a preset storage device, such as ROM and hard disk, for execution.

Figure 2:
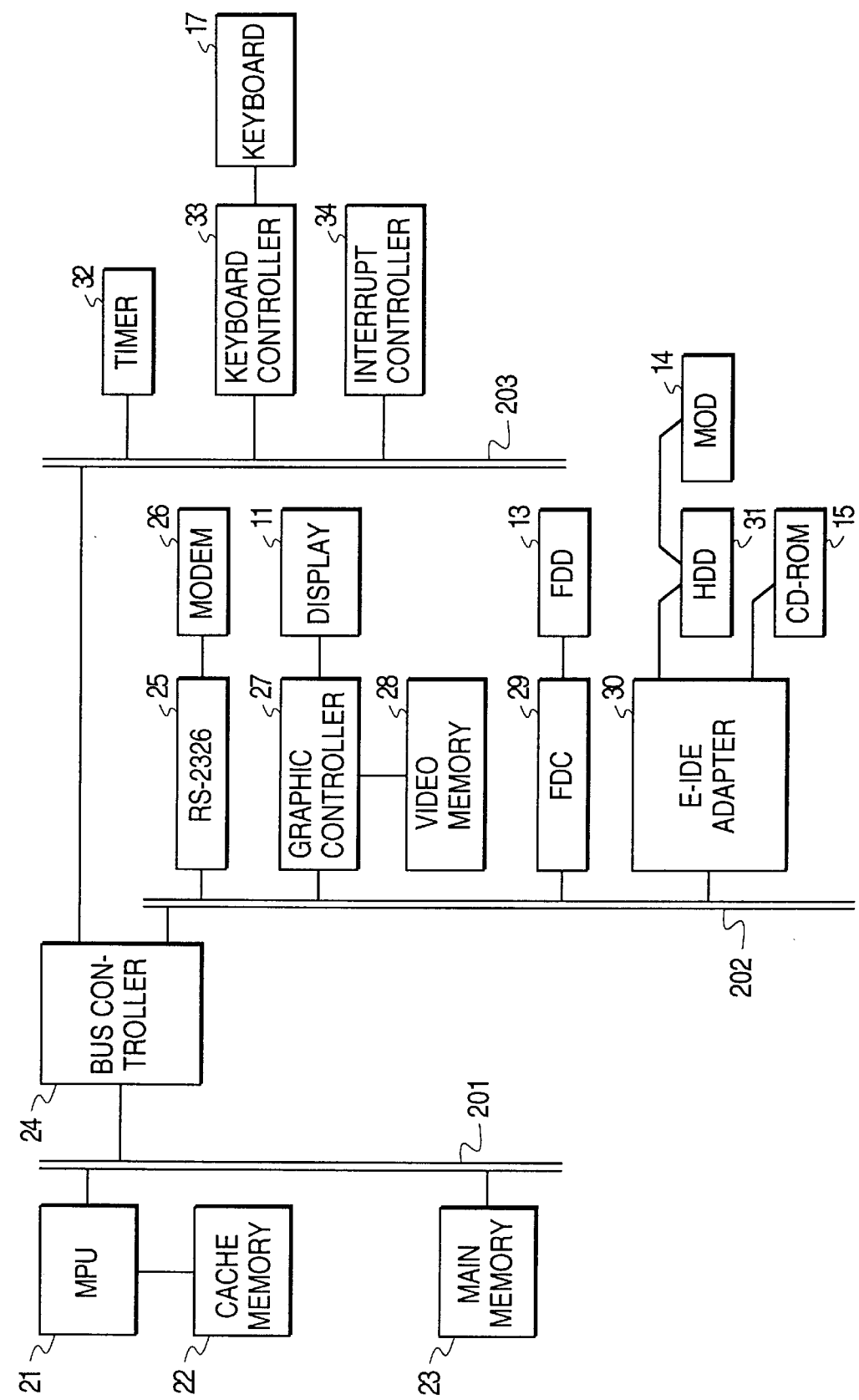
FIG. 2 is a block diagram of the personal computer 10 shown in FIG. 1.

FIG. 2 is a block diagram of the electronics of personal computer 10 shown in FIG. 1. A microprocessor (MPU) 21 is a heart of the personal computer 10 and executes a program using data stored in a main memory 23. Data exchange between the MPU 21 and the main memory 23 is carried out through an internal bus 201. A cache memory 22 is also used and includes memory elements having a high speed architecture, and stores data having a higher priority. A bus controller 24 is connected with the internal buses 201, 202 and 203 and controls the data exchange among the internal buses 201, 202 and 203.

The internal bus 202 is connected with the internal/external devices. In this personal computer 10, the internal bus 202 is connected to a modem 26 via an RS-232C interface adapter 25, to a display 11 via a graphic controller 27 and a video memory 28, and to floppy disk drive (FDD) 13 via a floppy disk controller (FDC) 29. The internal bus hard 202 is further connected with a magnetic disk drive (HDD) 31, a magneto-optical disk drive (MOD) 14 and a CD-ROM drive (CD-ROM) 15 via an E-IDE interface adapter 30. The E-IDE interface adapter 30 is an extended version of the traditional IDE interface and it is also a general standard interface. The internal bus 203 is used for interrupt control and is connected to a timer 32, to a keyboard 17 via a keyboard controller 33 and to an interrupt controller 34.

Figure 3:
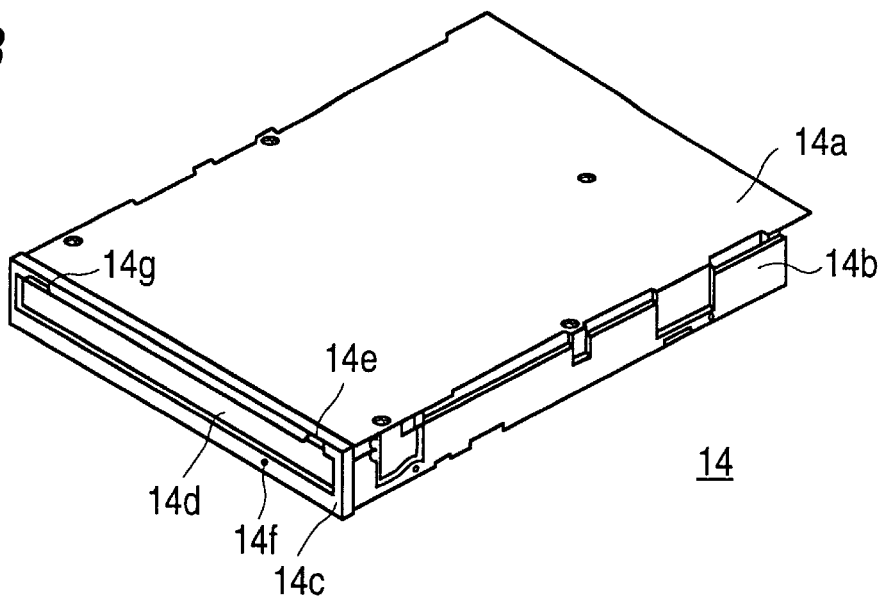
FIG. 3 is a perspective view of a magneto-optical disk drive 14 which is removed from the personal computer 10 shown in FIG. 1.

FIG. 3 is a perspective view of the magneto-optical disk drive 14 which is removed from the personal computer 10 shown in FIG. 1. The disk drive 14 is mainly composed of a printed circuit board 14a, a main body hidden under the printed circuit board 14a, a frame 14b and a front bezel 14c. The front bezel 14c is provided with a door 14d for closing the entrance for the cartridge when a cartridge is not inserted. An auto eject switch 14e is used for automatically ejecting the cartridge, a manual eject switch 14c for detecting the cartridge when no power is supplied and an LED lamp 14g for displaying the operating condition.

Figure 4A:
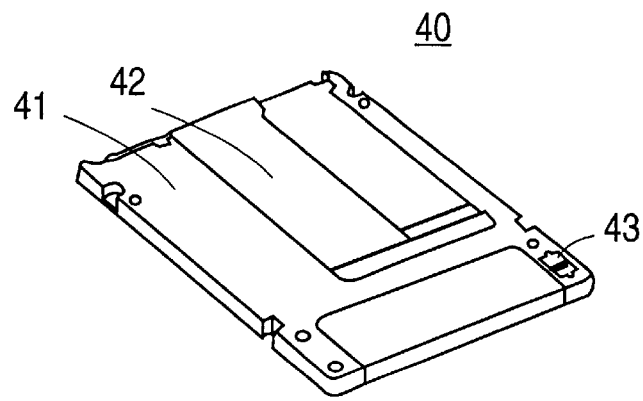
FIG. 4(a) is a perspective view of a magneto-optical disk cartridge when a shutter is closed and FIG. 4(b) is a perspective view of the magneto-optical disk cartridge when the shutter is open.
Figure 4B:
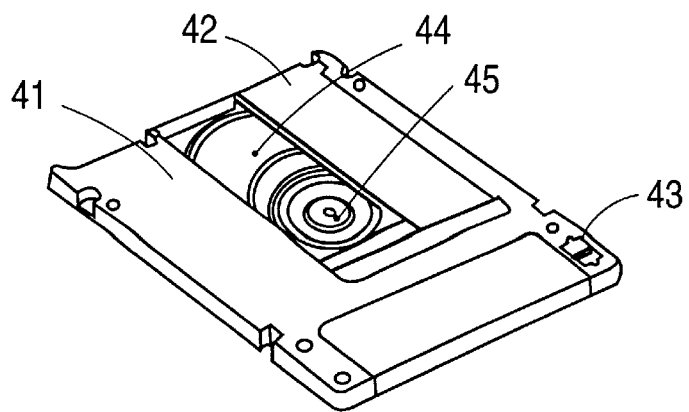

FIG. 4(a) is a perspective view of a magneto-optical disk cartridge 40 when a shutter 42 is closed and FIG. 4(b) is a perspective view of the magneto-optical disk cartridge 40 when the shutter 42 is open exposing the media 44. A magneto-optical disk cartridge 40 is primarily composed of a cartridge case 41, a shutter 42, a write protect tab 43, the magneto-optical disk medium 44 and a hub 45. The cartridge case 41 covers and protects the medium 44 from damage during manipulation and transportation of the disk cartridge 40. The shutter 42 is closed to protect the medium 44 from contamination when the disk cartridge 40 is not inserted into the disk drive 14, and is opened to record/reproduce to/from the medium 44 when the disk cartridge 40 is inserted into the disk drive 14. The write protect tab 43 indicates a write ready mode or a write protect mode based the position of the tab 43. The medium 44 stores the recorded information. The hub 45 is located at the center of the medium 44 and is positioned with respect to a turn table of the disk drive 14 when the disk cartridge 40 is inserted into the disk drive 14 and the hub 45 is coupled to the turn table of the disk drive 14.

An explanation of the principles of a write-after-erase operation will now be provided.

Figure 5A:
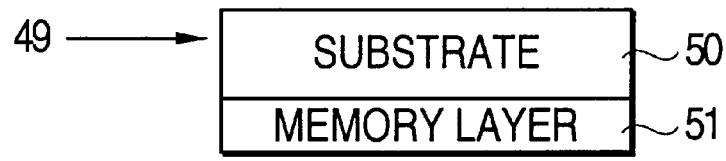
FIG. 5(a) is a partially sectional and schematic view of a write-after-erase type magneto-optical medium.

FIG. 5(a) is a partially sectional and schematic view of a write-after-erase type magneto-optical medium 49. The medium includes a transparent resin substrate 50 and a memory layer 51 of magnetic material.

Figure 5B:
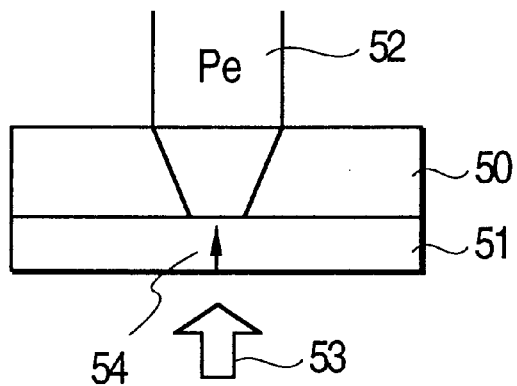
FIG. 5(b) is a schematic view explaining a principle of an erase process, of the write-after-erase operation.

FIG. 5(b) is a schematic view used for explaining the principle of an erase operation of the write-after-erase process. The disk drive 14 applies a magnetic field 53 on to perform an erase operation (initialization operation) on the medium and irradiates the medium with a laser beam 52 having an erase power level Pe. The memory layer 51 is heated to a temperature above the Curie point temperature by the radiation of the laser beam 52. The magnetic field 53 forces a magnetization 54 direction (or the magnetic flux field vector) of the memory layer 51 to be the same direction as the magnetic field 53. The memory layer 51 maintains the magnetization direction produced by the field 53 when the memory layer is cooled down below the Curie point. The memory layer 51 maintains the magnetization state until the memory layer 51 is again heated above the Curie point.

Figure 5C:
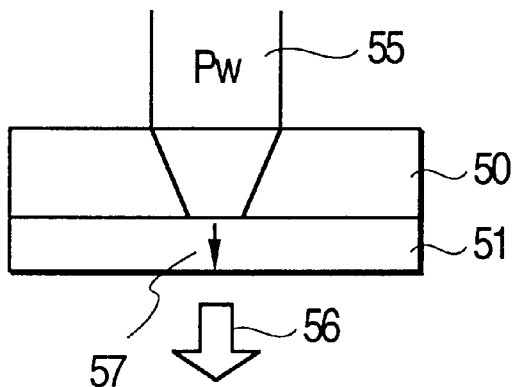
FIG. 5(c) is a schematic view explaining a principle of write operation of the write-after-erase process.

FIG. 5(c) is a schematic view of explaining the principle of a write operation of the write-after-erase operation. The disk drive 14 applies a magnetic field 56 during a write operation that has an opposite direction of the erase operation to the medium and irradiates a laser beam 55 at a constant write power level Pw to the medium. The beam 55 is applied responsive to the data to be written. The magnetic field 57 forces a magnetization direction 57 (on the magnetic flux field vector) of the memory layer 51 to be the same direction as the magnetic field 56.

Figure 6A:
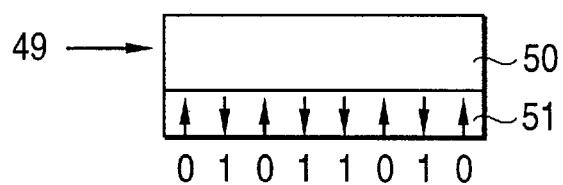
FIGS. 6(a), 6(b) and 6(c) are respectively schematic views illustrating the state of magnetization before the write-after-erase type erase operation, after the erase operation and after the write operation.
Figure 6B:
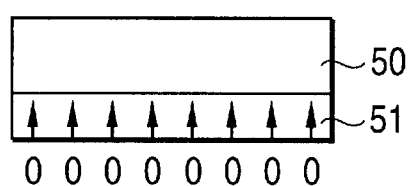
Figure 6C:
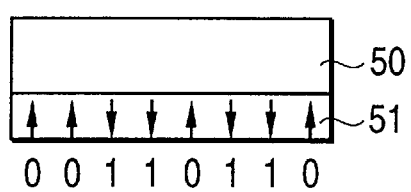
Figure 6D:
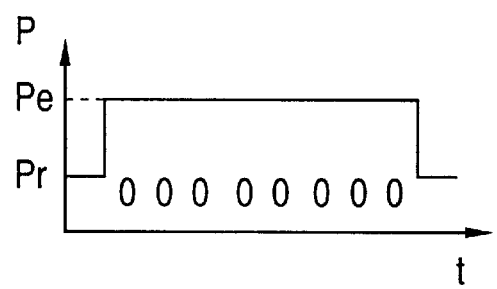
FIGS. 6(d) and 6(e) are respectively wave form charts illustrating the power level of the laser beam during the erase operation and the write operation.
Figure 6E:
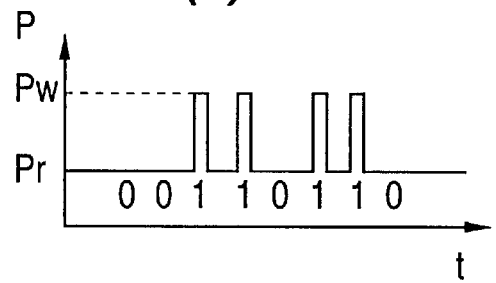

FIGS. 6(a)–6(c) are respectively schematic views illustrating the state of magnetization before the write-after-erase erase operation, after the erase operation and after the write operation. FIG. 6(d) and 6(e) are respectively wave form charts depicting the power level of the laser beam during the erase operation and the write operation.

Before the write-after-erase operation begins the memory layer 51 stores, for example, 8 bits of data "01011010" as shown in FIG. 6(a). First, the disk drive continually irradiates the medium 49 with the laser beam at an erase power level Pe as shown in FIG. 6(d) while applying a constant magnetic field. As a result, all bits of the memory layer 51 are magnetized in the same direction, that is, erase data "00000000" is recorded on the memory layer 51 as shown in FIG. 6(b).

Next, the disk drive reverses the direction of the magnetic field 53 and selectively (locally) irradiates the medium with the laser beam with one of a write power level Pw and a read power level Pr responsive to write data as shown in FIG. 6(e). The write power level raises the medium temperature above the Curie point. The disk drive irradiated with a laser power having at least read power level Pr to allow a tracking operation to be conducted during the write operation. As a result, only selected bits of the memory layer 51, where the write power level of the laser beam is irradiated, are magnetized in the reverse direction, that is, data "00110110" is recorded on the memory layer 51.

An explanation of the principle of a direct-over-write operation will now be explained.

Figure 7A:
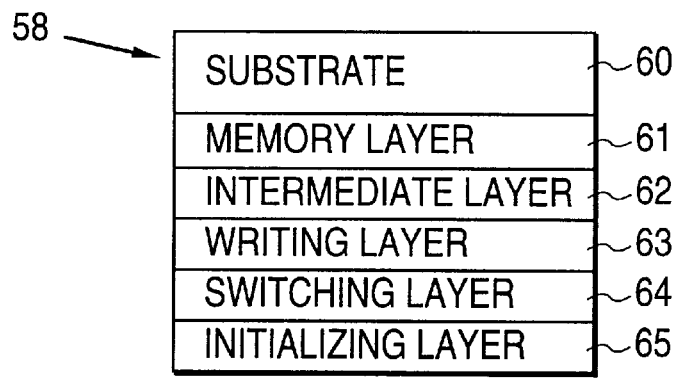
FIG. 7(a) is a partially sectional and schematic view of a direct-over-write type magneto-optical medium.

FIG. 7(a) is a partially sectional and schematic view of a direct-over-write type magneto-optical medium 58. The medium 58 includes a substrate 60 made of a transparent resin, a first magnetic layer acting as a memory layer 61, a second magnetic layer acting as an intermediate layer 62, a third magnetic layer acting as a writing layer 63, a fourth magnetic layer acting as a switching layer 64 and a fifth magnetic layer acting as an initializing layer 65.

Figure 7B:
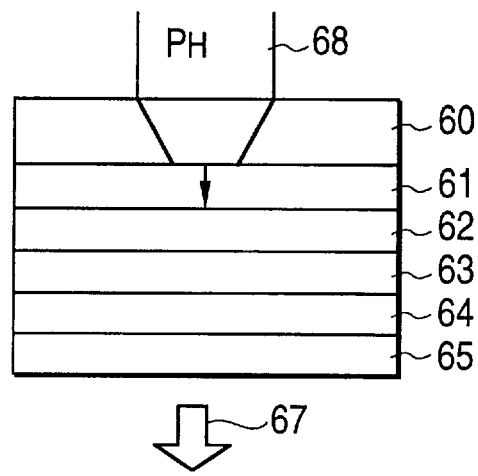
FIGS. 7(b) and 7(c) are respectively schematic views illustrating the direct-over-write operation when "1" is recorded and when "0" is recorded.
Figure 7C:
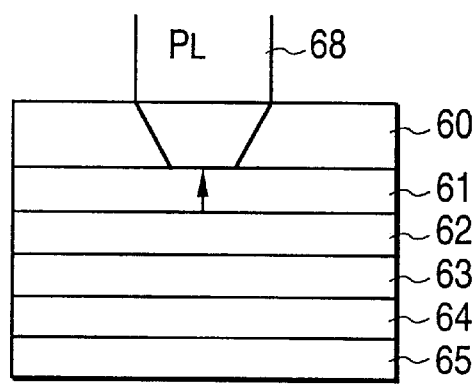
Figure 7D:
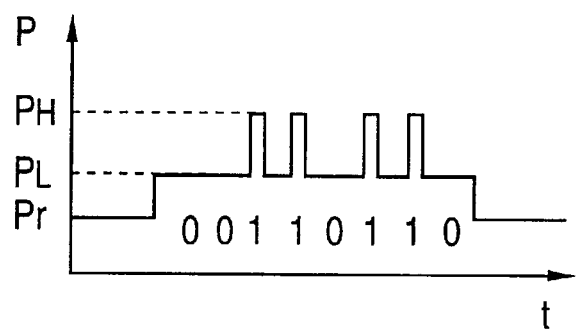
FIG. 7(d) is a wave form chart illustrating the power level of the laser beam during the direct-over-write operation.

FIGS. 7(b) and 7(c) are respectively schematic views illustrating the direct-over-write operation when "1" is recorded and when "0" is recorded, and FIG. 7(d) is a wave form chart illustrating the power level of the laser beam during the direct-over-write operation.

The disk drive 14 applies a magnetic field 67 to the medium 58 and irradiates the medium 58 with the laser beam having a high write power level PH when "1" is recorded. When "0" is recorded, the disk drive 14 irradiates the medium 58 with the laser beam having a low write power level PL. Moreover, the disk drive 14 can constantly apply the same magnetic field 67 to the medium 58 even though "0" is to be recorded, because the magnetic field 67 has no effect on the memory layer 61 when the low level PL laser beam is irradiated. The disk drive 14 also irradiates the medium 58 the laser beam having a read power level Pr during a read operation or a tracking operation. These power levels rise to higher levels in the sequence of Pr, PL and PH as illustrated in FIG. 7(d).

FIGS. 8(a) and 8(b) are respectively schematic views illustrating the state of the magnetic layers 61–65 when storing "1" and "0". The state of the magnetization of the memory layer 61 signifies "1" or "0". In this example, upward magnetization state (or direction of the magnetic field flux vector) signifies "0" and the downward magnetization state signifies "1". The initializing layer 65 he writing layer 63, the switching layer 64 and the initializing layer 65 are shown magnetized upward. The initializing layer 65 has the same magnetic direction as the "0" data regions.

FIGS. 8(c)–8(f) are schematic views used for explaining the direct-over-write operation of data "1". In FIG. 8(c), the laser beam 66 having the high write power level PH is irradiated onto the medium 58. The beam 66 heats the medium 58, however, even with the high write power level PH, the initializing layer 65 having the highest Curie point is not heated up to its Curie point. The magnetization state of the initializing layer 65 is not lost and remains, while the memory layer 61, the writing layer 63 and the switching layer 64 are heated above their negative Curie points. As a result, the magnetization state of the layers 61, 63 and 64 is lost.

In FIG. 8(d), the writing layer 63 has the next highest Curie point to the initializing layer 65 and is magnetized in the same direction as the magnetic field 67 when the writing layer 63 is cooled down below its Curie point. In FIG. 8(e), the memory layer 61 having the next highest Curie point after the writing layer 63 is magnetized in the same direction as the writing layer 63 by a field exchange coupling action between the writing layer 63 and the memory layer 61.

In FIG. 8(*f*), the switching layer 64 having the lowest Curie point is magnetized in the same direction as the initializing layer 65 by the exchange coupling action between the initializing layer 65 and the switching layer 64 when the switching layer 64 is cooled below the Curie point. Then, the writing layer 63 that has been magnetized downward is also inversely magnetized by the exchange coupling action between the switching layer 64 and the writing layer 63. However, since the exchange coupling action between the memory layer 61 and writing layer 63 is reduced by the intermediate layer 62, the memory layer 61 is not inversely magnetized by the exchange coupling action and maintains its magnetization state.

FIGS. 8(*g*)–(*i*) are schematic views for explaining the direct-over-write operation of data "0". In FIG. 8(*g*), the laser beam 68 with the low write power PL is irradiated. With the writing power PL which is lower than the high write power PH, the writing layer 63 is not heated up to the Curie point, however, the memory layer 61 and the switch layer 64 are heated above their Curie points. Therefore, the memory layer 61 and the switching layer 64 lose their magnetization state, but the writing layer 63 maintains its magnetization state. In FIG. 8(*h*), the memory layer 61 is magnetized in the same direction as the writing layer 63 by the exchange coupling action between the writing layer 63 and the memory layer 61 when the memory layer 62 cools down below its Curie point. In FIG. 8(*i*), in the same way, the switching layer 64 is magnetized by the exchange coupling action between the initializing layer 65 and the switching layer 64.

Figure 9:
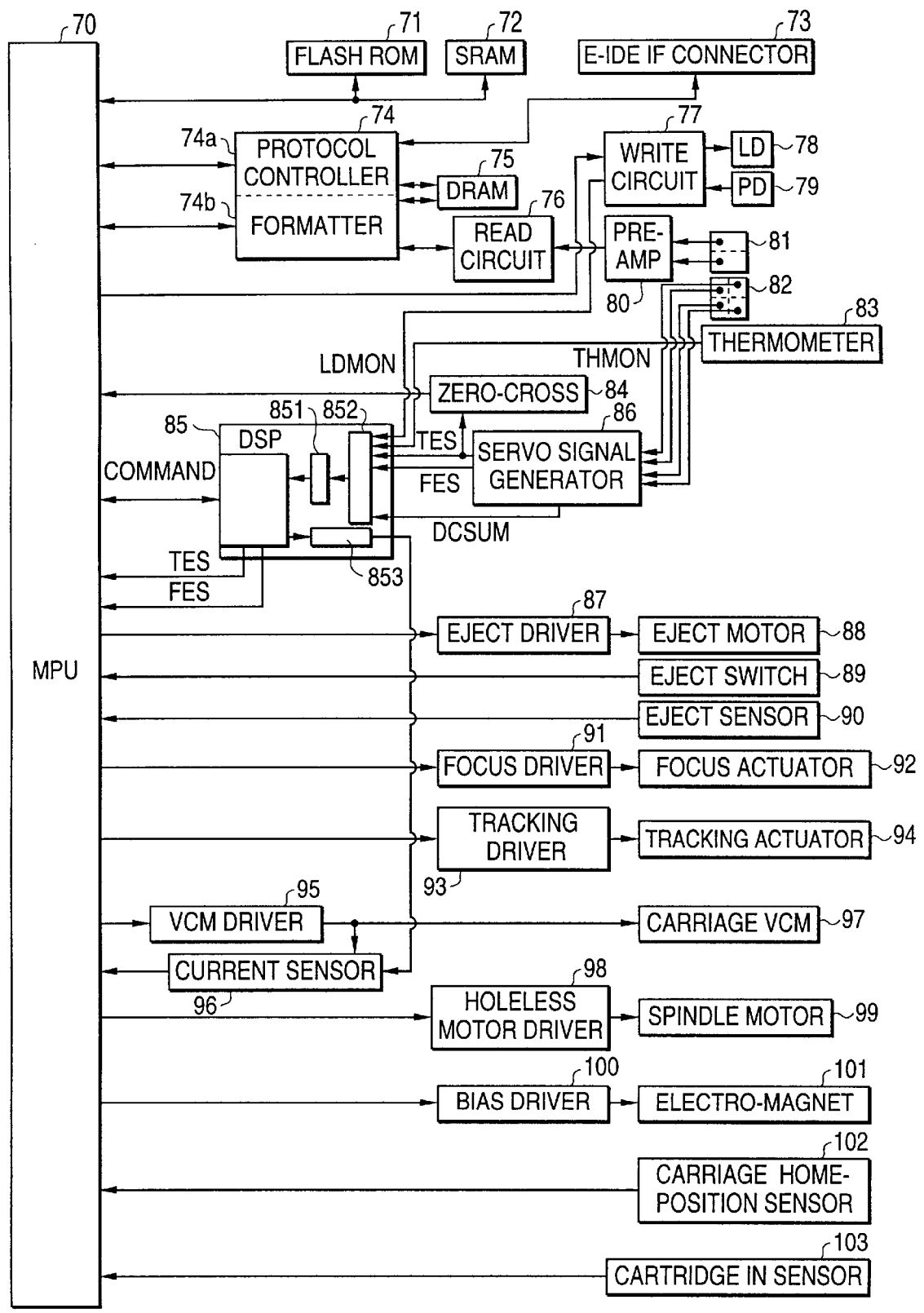
FIG. 9 is a block diagram of a magneto-optical disk drive according to the present invention.

FIG. 9 is a block diagram of a magneto-optical disk drive. A microprocessor (MPU) 70 performs various control operations such as interface control, servo control of actuators and drive control of motors. A flash ROM 71 stores programs and data. SRAM 72 is used as a working memory. E-IDE interface 73 connects the magneto-optical disk drive to internal bus of the personal computer for exchange of commands and data with the personal computer.

A protocol controller unit 174 is composed of a protocol controller 74*a* and a formatter 74*b*. The protocol controller 74*a* analyzes the commands received through the interface connector 73 and then notifies the MPU 70. The formatter 74*b* controls error checking and correction (ECC), read/write data transfer and detection of sector marks. DRAM 75 stores the data received from the personal computer and also stores the data which is read from the medium and transferred to the personal computer.

A read circuit 76 performs automatic gain control (AGC), filtering and pulse shaping for the output signal of a pre-amplifier 80. The pre-amplifier 80 amplifies the output signals of a photo detector 81 divided into two parts and which is used during the read operation. A write circuit 77 sets a beam emitting power level of the laser diode (LD) 78, generates a beam level monitor signal (LDMON) base on an output signal of a photo detector (PD) 79 and controls the write operation responsive to write data.

A servo signal generating circuit 86 generates, from an output signal of a detector 82 divided into four parts, a tracking error signal (TES), a focus error signal (FES) and a sum signal of the detector 82 (DCSUM). A zero-cross comparator 84 has an hysteresis characteristic, detects a zero-crossing point of TES generated as the bean is crossing the track, and outputs the zero-crossing point of TES to the MPU 70.

A digital signal processor (DSP) 85 includes an analog-to-digital converter (ADC) 851, a multiplexer 852, and a digital-to-analog converter (DAC) 853. The multiplexer 852 selects one of LDMON, FES, TES, DCSUM, a temperature monitor signal (THMON) from a temperature sensor 83 and outputs the selected signals to the ADC 851 the digital FES and TES signals are output to MPU 70.

An eject motor 88 is driven when a disk cartridge is ejected. That is, when MPU 70 detects that the eject switch 89 is depressed, MPU 70 controls an eject driver 87 to drive the eject motor 88. Moreover, MPU 70 confirms that the eject operation has been normally completed with an eject sensor 90.

A focus actuator 92 and a tracking actuator 94 are mounted on the optical head and operate within a very small range. These actuators 92 and 94 are driven by a focus driver 91 and a tracking driver 93. The drivers 91 and 93 are controlled by MPU 70 based on the FES and TES signals provided to the MPU 70. A carriage coil motor (VCM) 97 moves the optical head to the desired radius position of the disk medium. A VCM driver 95 is controlled by the MPU 70 and the control action depends on the number of tracks from the present position to the target track and drives the carriage VCM 97 to move the carriage VCM 97 to the target track. A carriage home position sensor 102 detects that the carriage VCM 97 has moved to a predetermined home position.

A spindle motor 99 is a holeless type of motor provided for rotating the disk medium at a constant speed. MPU 70 controls a holeless motor driver 98 to drive the spindle motor 99 after MPU 70 detects that the loading operation of the disk cartridge has been completed by the cartridge-in sensor 103. An electromagnet 102 applies a magnetic field to the medium and is controlled by MPU 70 through a bias driver 100.

Figure 10:
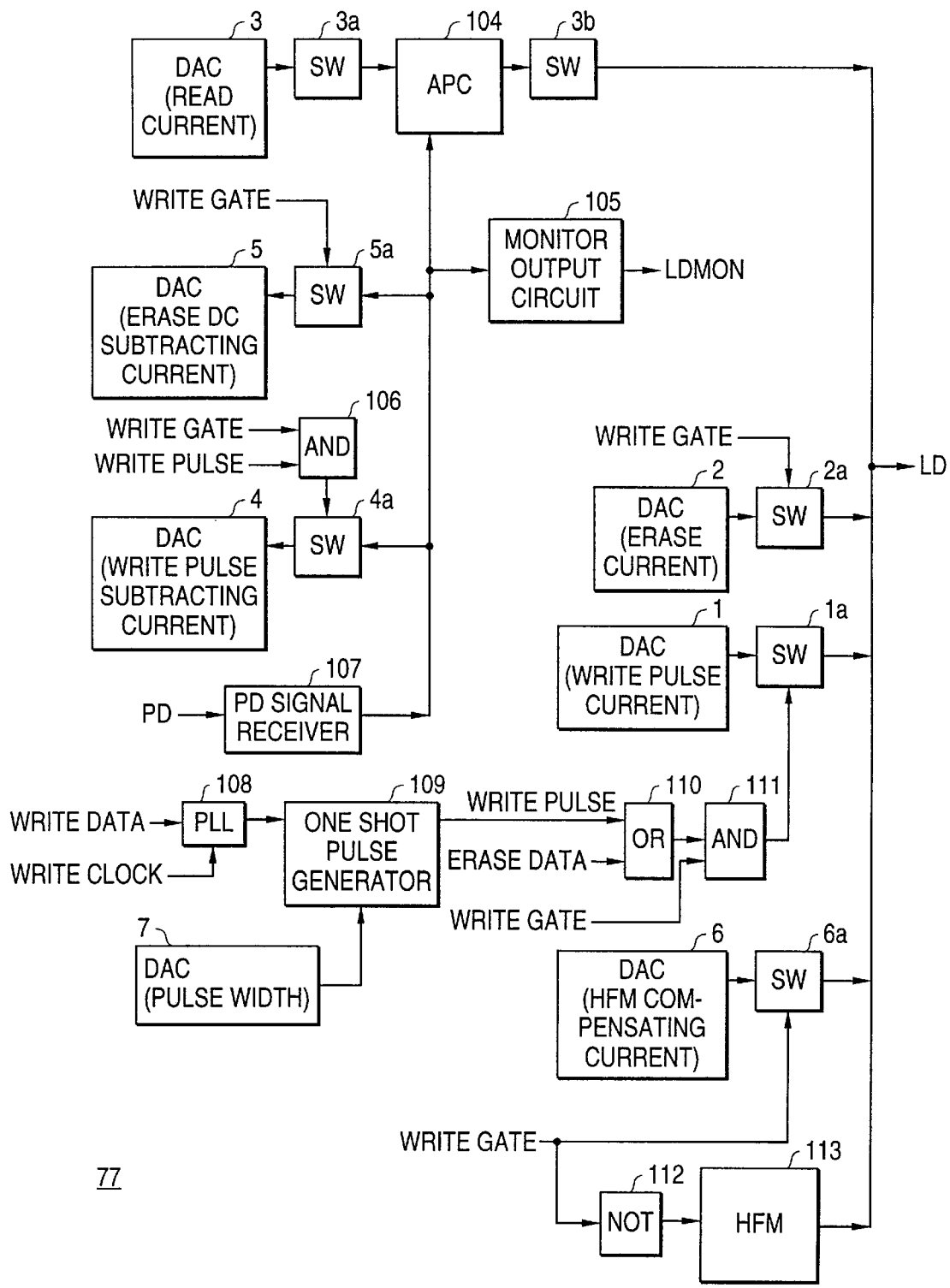
FIG. 10 is a block diagram of the write circuit 77 of the present invention.

FIG. 10 is a block diagram of the write circuit 77 of the present invention. The basic circuit structure is explained first and then the operation of the write circuit 77 is explained with reference to FIGS. 11(*a*) to FIG. 13(*l*).

In FIG. 10, first, the write circuit controls light emission power of a laser diode LD 78. The current sources for supplying currents to LD 78 include DAC 3, DAC 2, DAC 1 and DAC 6, and high frequency module 113 is also provided. A current, that will produce the desired power level can be supplied to LD 78 by selecting the elements with one or more switches.

The write circuit is provided with an auto-power control (APC) circuit 104 which is used for compensating for variations of in the light emitting power of LD. The APC circuit 104 receives an input of the PDMON signal and controls a current supplied to LD to maintain a constant value for the PDMON signal. The PDMON signal can be generated by subtracting an incremental current values from the output of the photodetector PD 79 to account for the erasing operation or the writing operation using DAC 4 and DAC 5. As a result the PDMON signal always has an output corresponding to the read power even during any of the operations among the reproducing/erasing/writing operations.

If an output of PD 79 is input directly to APC circuit, without subtracting incremental currents associated with the erasing or writing operation, when laser power of LD 78 is switched, for example, to the writing power from the reproducing/reading power, the PD 78 output naturally increases and the APC circuit 104 could still reduce a current to be supplied to LD 78 to reduce the PD 79 output.

The write circuit includes a DAC 7 for setting a pulse width of write pulses for each bit and a high frequency module (HFM) 113 for superimposing a high on the signal to LD 78 during the reproducing operation. The write circuit 77 also includes addition circuits including switches 1a, 2a, 3a, 4a, 5a, 6a, gates 106, 110, 111 and 112 and a phase-lock-loop circuit 108, a one-shot pulse generator 109, a photo diode signal receiver 107, and a monitor output circuit 105.

FIGS. 11(a)–(e) are wave form diagrams used for explaining the read operation of the write circuit 77 of FIG. 10.

DAC 3 outputs, as shown in FIG. 11(a), a read current I3 for of the write-after-erase type medium or direct-over-write type medium depending on the medium loaded. In this situation, the switches 3a, 3b are in the ON state, while the switches of the other DACs are in the OFF state. The HFM 113 receives an inverted write gate signal from a NOT circuit 112. HFM 113 receives an H level input during the reproducing or read operation and is turned ON as shown in FIG. 11(b). Accordingly, a current flowing into LD is equal to a sum of the current of DAC 3 and the current of HFM 113 as shown in FIG. 11(c). When this current is applied to LD 78, the diode 78 a light beam with this predetermined reproduction or read power.

The output of the PD 78 includes an average of high frequency signal produced by HFM 113 as shown in FIG. 11(d). Since the PDMON signal input to the APC circuit 104 does not include a subtracting current of the DAC 4 and DAC 5, it is equal to an output of PD 79 as shown in FIG. 11(e). The APC circuit 104 adjusts the current supplied to LD 79 so that the PDMON signal is constant.

FIGS. 12(a)–(j) are wave form diagrams used for explaining the write-after-erase operation of the write circuit 77 of FIG. 10. FIGS. 12(a) and 12(b) depict the write gate signal and write data signal input to the write circuit 77. FIG. 12(c) is an output from SW 3b of DAC 3. DAC 3 outputs a read current I3 for the loaded write-after-erase type medium. Switches 3a, 3b are always in the ON state, without regard to the state of the write gate signal and thus always outputs the read current I3 of the DAC 3. FIG. 12(d) is an output from HFM 113. When the write gate signal becomes the H level, the input to HFM 113 becomes L level because of circuit 112, turning HFM 113 OFF.

FIG. 12(e) is an output from switch 6a of DAC 6. DAC 6 outputs an HFM compensating current I6 and SW 6a outputs the HFM compensating current I6 from DAC 6 during the period that the write gate signal is at the H level. This HFM compensating current I6 compensates for the drop in the power of the light emitting diode (LD) 78 when the operation of HFM 113 is turned OFF. During the reproducing operation, the light emitting power of LD 78 is reduced by as much as the superimposed high frequency signal of the HFM 113 to lower than the read power. If the HFM 113 is left operating during the writing operation, the high frequency current from HFM 113 is added to the current corresponding to the writing power and applied to LD 78. In this situation, the peak current exceeds the specification of LD 78, accelerating breakdown or deterioration of LD 78.

FIG. 12(f) is an output from switch 1a of DAC 1. DAC 1 outputs a write pulse current I1. Switch 1a is synchronized with the write clock and controls ON and OFF the supply of the write pulse current I1 to LD 78 with a logical AND 111 of the write pulse and write gate signal having a duration determined by DAC 7. The write pulse is produced by one-shot pulse generator circuit 109 based on a phase-lock-loop signal locked to the write data by a phase-lock-loop current 109 and the duration.

FIG. 12(g) illustrates the current applied to LD 78, which is a sum of the read current I3 and high frequency signal current of HFM 113 when the write gate signal is L level, or a sum of the read current I3 and HFM compensating current I6 when the write gate signal is H level and the write data is L level, or a sum of the read current I3, HFM compensating current I6 and write pulse current I1 when the write gate signal is H level and the write data is H level.

FIG. 12(h) is an output of PD 79 and has a wave form similar to the current applied to LD 78. However, the high frequency supplied to LD 78 is averaged. FIG. 12(i) is an output of switch 4a of DAC 4. DAC 4 outputs a current I4 in which write pulse is subtracted and switch 4a turns ON and OFF producing the subtraction of the write pulse from PD output with logical AND 106 of the write pulse and write gate signal. FIG. 12(i) is the resulting PDMON signal input to the APC circuit 113. The write pulse current is subtracted from the PD output to become the current corresponding to the read power.

FIGS. 13(a)–(l) are wave form diagrams for explaining the direct-over-write operation of the write circuit 77 of FIG. 10 for the direct-over-write type medium. FIGS. 13(a) and 13(b) depict the write gate signal and the write data input to the write circuit 77. FIG. 12(c) is an output from switch 3b of DAC 3. DAC 3 outputs a read current I3 for the direct-over-write type medium, while switches 3a and 3b are always in the ON state without relation to ON, OFF state of the write gate signal and output the read current I3 of DAC 3. FIG. 13(d) is an output from HFM 113. When the write gate signal becomes the H level, an input to HFM 113 becomes the L level and HFM 113 turns off.

FIG. 13(e) is an output from switch 6a of DAC 6 and DAC 6 outputs an HFM compensating current I6 while switch 4a outputs the HFM compensating current I6 from DAC 3 during the period where the write gate signal is L level. This HFM compensating signal compensates I6 drop of the power of LD because when the operation of HFM 113 is turned OFF during the reproducing operation, the light emitting power of LD is reduced by as much as the superimposed high frequency element of HFM 13 to become lower than the read power. When the HFM 113 is left operating during the write operation, a high frequency current from HFM 113 is added to the current corresponding to the writing power and being applied to LD. As a result, the peak current will exceed the current specification of LD 78, accelerating breakdown or deterioration of LD 78.

FIG. 13(f) is an output from switch 2a of DAC 2. DAC 2 outputs an erase current I2 for generating the erasing power PL for the direct-over-write type medium. Switch 2a supplies the erase current I2 to LD 78 when the write gate signal is the H level.

FIG. 13(g) is an output from switch 1a of DAC 1. DAC 1 outputs a write pulse current I1 for generating the writing power PH of the direct-over-write type medium. Switch 1 is synchronized with the write clock signal and controls ON and OFF the supply of the write pulse current I1 to LD 78 with the logical AND 111 of the write pulse and write gate signal having the pulse duration determined by DAC 7.

FIG. 13(h) illustrate the current supplied to LD 78, which is a sum of the read current I3 and high frequency current of HFM 113 when the write gate signal is the L level, or a sum of the read current I3, HFM compensating current I6 and erase current I2 when the write gate signal is H level and write data is the L level, or a sum of the read current I3, HFM compensating current I6, erase current I2 and write pulse current I1 when the write gate signal is H level and write data is the H level.

FIG. 13(i) is an output of PD 79 and is a waveform similar to a current supplied to LD 78. However, the high frequency signal content supplied to LD 78 is averaged. FIG. 13(j) is an output of switch 4a of DAC 4. DAC 4 outputs a current I4 so that the write pulse is subtracted and switch 4a turns ON and OFF to produce the subtraction of the write pulse from PD output based on the logical AND 106 of the write pulse and write gate signal. FIG. 13(k) is an output of switch 5a of DAC 5. DAC 5 outputs a current I5 allowing the erase current to be subtracted and switch 5a subtracts the erase current I5 (erase DC subtraction current) from the PD output when the write gate signal is H level. FIG. 13(l) is the PDMON signal input to the APC circuit 113. The write pulse subtraction current I4 and the erase current I5 are subtracted from the PD output to produce a current corresponding to the read power.

Figure 14:
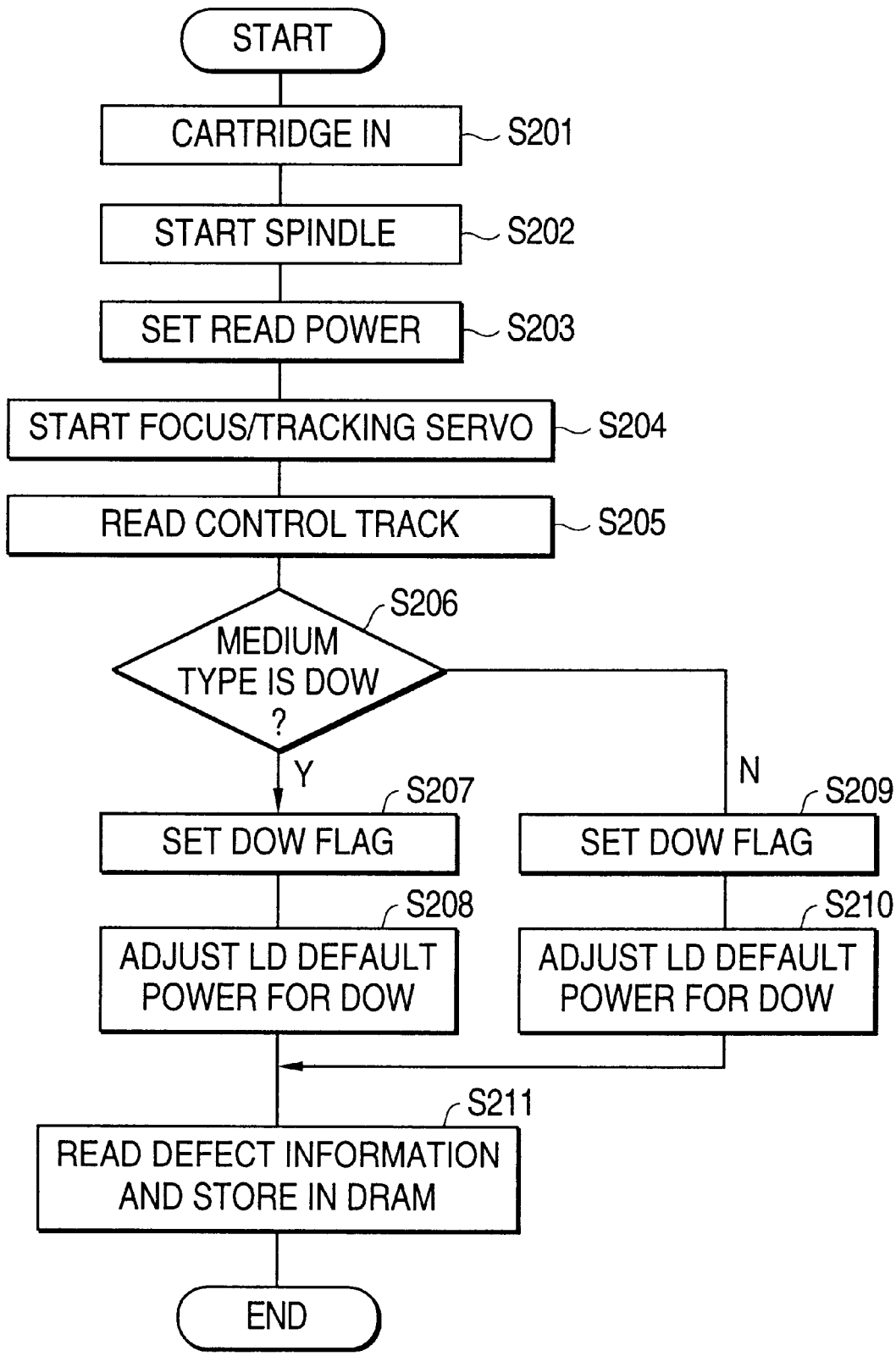
FIG. 14 is a flow chart of the cartridge loading operation of the present invention.

FIG. 14 is a flow chart of the cartridge loading operation of the present invention. When a cartridge is loaded in step S201, the spindle motor 99 is started to rotate in step S202. In the step S203, the read power for the read only section of medium (prestamped pit and land section) is set for DAC 3 of the write circuit 77, causing the laser diode LD 78 to emit the read light beam. In step S204, the focus servo and tracking servo operations are started. In step S205, the control track is read to obtain information in the control track recorded in the read only section. This track includes the information that indicates the type of the medium.

When the direct-over-write (DOW) type medium is detected in the control track in step S206, a flag indicating the DOW type is set in SRAM 72 in step S207 and a default power level adjustment is made for the direct-over-write type medium in the step S208. Moreover, when the write-after-erase (MO) type medium is detected in step S206, a flag indicating the MO type is set in SRAM 72 in step S209, and a default power level adjustor of LD 78 for the MO type medium is performed in the step S210. In the step S211, defective block information written on the medium is stored in the DRAM 75.

Figure 15:
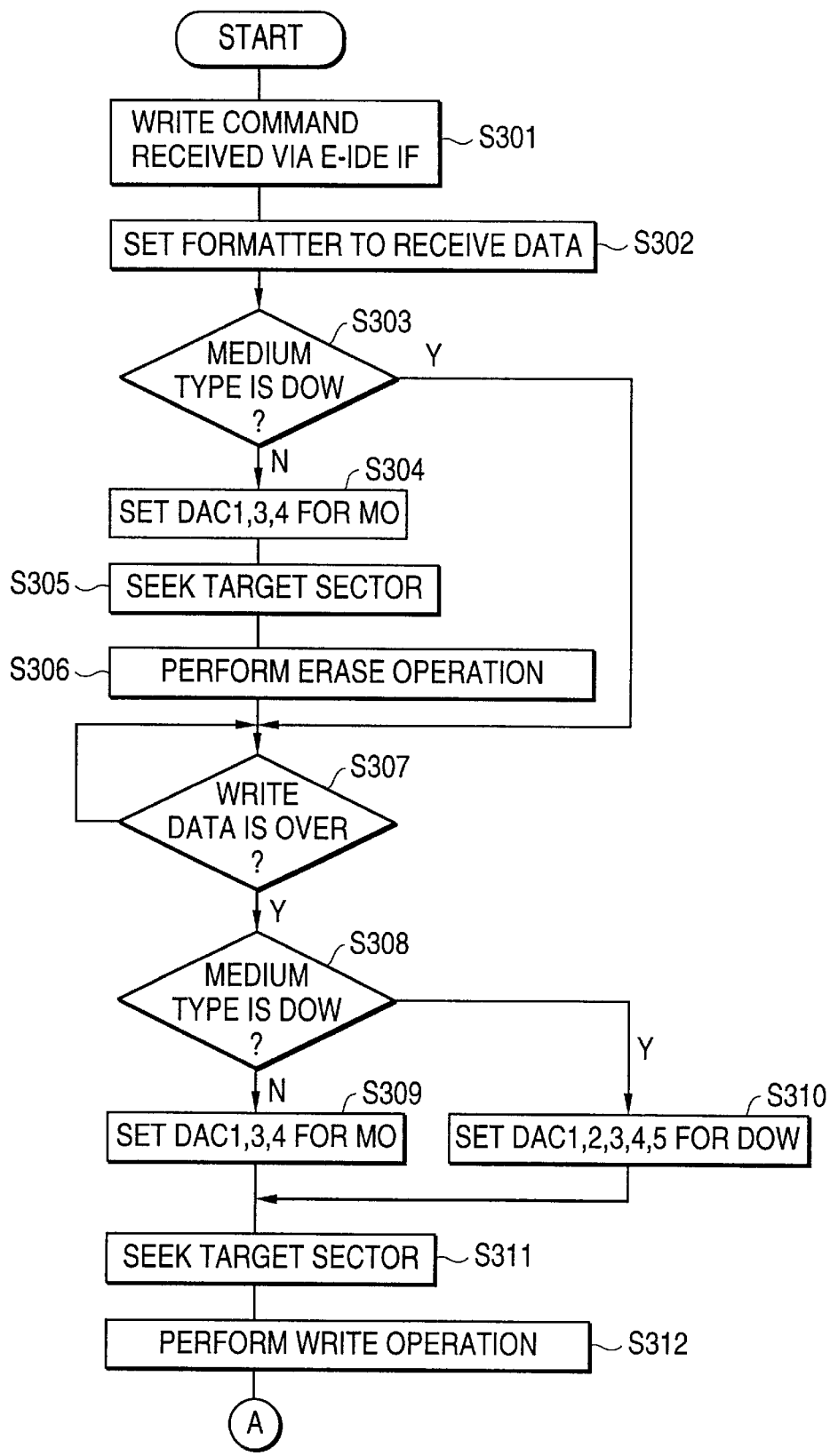
FIGS. 15 and 16 comprise a flow chart of the write command operation of this invention.
Figure 16:
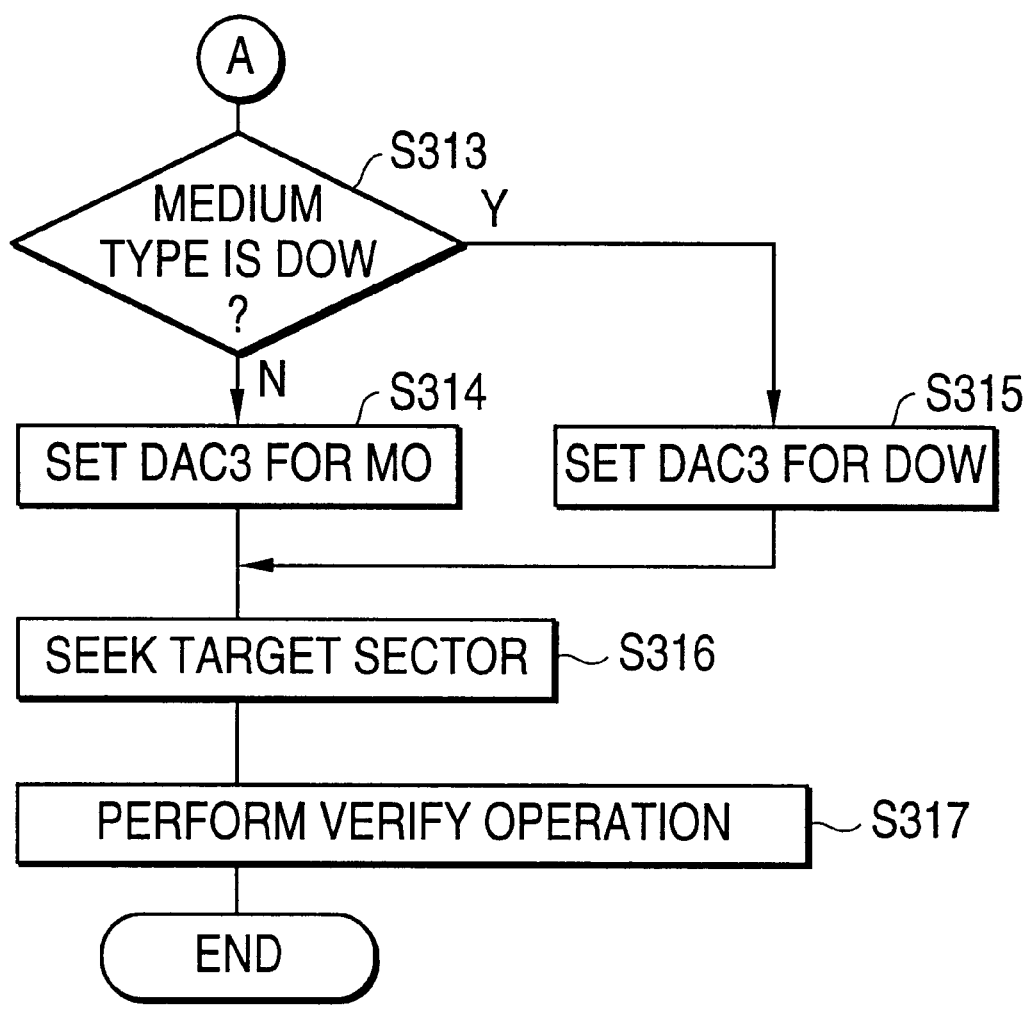

FIG. 15 and FIG. 16 are flow charts for explaining execution of the write command by the magneto-optical disk drive. In step S301, the E-IDE protocol controller 74a receives a write command, interprets it and indicates the content of the command to the MPU 70. In step S302, MPU 70 the formatter section 74b to receive data and formatter 74b stores the received data in DRAM 75 which is used as data buffer.

Next, in step S303, MPU determines the medium flag stored in the SRAM 72. When the flag does not indicate the direct-over-write (DOW) type medium, that is, when the flag indicates the write-after-erase (MO) type medium, an erase current, read current and erase subtracting current are set in DAC 1, DAC 3, DAC 4 of the write circuit 77 in step 304 by loading the appropriate current values into the inputs of the DACs. In step 305, the drive seeks to the target sector. In step S306, MPU 70 indicates that an erase operation is to be performed to the formatter 74b and the write circuit 77 executes the erase operation. As a result, the write circuit in FIG. 10 loads the erase current value into DAC 1, supplies the erase data of the H level to the OR circuit 110, while witch 1a continuously supplies the erase current supplied from DAC 1 to LD 78 during the H level of write gate signal.

Subsequently, when the erase data operation is finished as detailed in step S307, the medium flag stored in the SRAM 72 is check again in step S308. When the medium flag indicates the MO type medium, the write pulse current I1, read current I3, write pulse subtracting current I4 values explained which respect to FIG. 12 are respectively set or loaded into DAC 1, DAC 3 and DAC 4 in step S309. When the medium flag indicates the direct-over-write (DOW) type medium in step S308, the write pulse current I1, erase current I2, read current I3, write pulse subtracting current I4, erase DC subtracting current I5 values as explained with respect to FIG. 13 are respectively loaded into DAC 1, DAC 2, DAC 3, DAC 4, DAC 5. In step S311, head seeks the target sector and in the step S312, MPU 70 tells the formatter section 74b to perform the write operation.

Subsequently, in step S308 (see FIG. 16), the medium flag stored in the SRAM 72 is again examined. When the medium flag indicates the MO type medium, the read current value of the write-after-erase (MO) type medium is loaded into DAC 3 in step S314. When the medium flag indicates the DOW type medium in step S313, the read current value of the DOW type medium is loaded into DAC 3. The target sector is sought in the step S316 and MPU 70 tells the formatter 74b in step S317 which reads the written data and compares it to determine whether it is correct.

FIG. 17 is a data structure of the information in the control track of the magneto-optical medium. The control track stores in the read only section of the medium, a recording type information of zone recording or not, a recording type information of mark edge recording or mark position recording, a recording type information of land recording or groove recording, medium type information, write condition information, erase condition information and read condition information, etc.

The medium type can be determined by reading information from the control information track of the medium or it can be determined mechanically from conventional indications on the disk or cartridge such as recesses and or notches.

FIG. 18 and FIG. 19 depict the compensation tables for compensating the target laser power for the MO type medium and DOW type medium, respectively, based on the temperature measured by the sensor 83. These tables are stored in the flash ROM 71 shown in FIG. 9. In the case of write-after-erase (MO) type medium, a writing power Pw and erasing power PE are set for each zone and temperature. In the case of direct-over-write (DOW) type medium, the writing power PH and erasing power PL are set for each zone and temperature.

FIG. 20 and FIG. 21 depict tables for setting values of the specified DACs of the write circuit for the MO type or DOW type medium respectively. These tables are generated at the time fine adjustment of the laser diode in the cartridge loading operation shown in FIG. 14 and are then stored in the SRAM 72 shown in FIG. 9. The needed table can be generated from the monitor output obtained by using the table of FIG. 18 or FIG. 19 and irradiating the medium actually loaded with the laser beam.

The present invention provides a novel optical modulation type magneto-optical disk drive which supports the existing magneto-optical disk medium and also a direct-over-write type magneto-optical medium. The present invention also provides a small size and light weight magneto-optical disk drive which can support both existing magneto-optical disk medium and direct-over-write type magneto-optical disk medium. The present invention uses a common writing circuit for existing magneto-optical disk medium and the direct-over-write type magneto-optical disk medium to prevent an increase of the scale/size of the writing circuit.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A magneto-optical drive for writing data to a removable magneto-optical medium, comprising:

a detector detecting whether a medium loaded into the drive is a write-after-erase medium or a direct-over-write medium; a laser diode producing a laser beam irradiating the medium loaded;

a first power supply supplying said laser diode a first power level, said first power level being a read power level for a read operation;

a second power supply supplying said laser diode a second power level, said second power level being a difference between the read power level and a first over-write power level of a direct-over-write operation;

a first switch coupled between said second power supply and said laser diode, turned on during the direct over write operation and turned off during a write-after-erase operation;

a third power supply supplying said laser diode a third power level, said third power level being applied during the direct-over-write operation as a difference between the first over-write power level and a second over-write power level of the direct over-write operation and during the write-after-erase operation as a difference between the read power level and a write/erase power level of the write-after-erase operation; and a second switch coupled between said third power supply and said laser diode, and turned on/off responsive to write data.

2. The magneto-optical drive of claim 1, wherein said first, second and third power supplys provide adjustable power levels.

3. The magneto-optical drive of claim 2, further comprising a controller coupled to said first, second and third power supplies and controlling the power levels of said first, second and third power supplies.

4. The magneto-optical drive of claim 3, further comprising a memory storing power adjustment information, and said controller reading the power adjustment information and adjusting said first, second and third power suppliers using the power adjustment information.

5. The magneto-optical drive of claim 4, further comprising a thermometer, and said memory storing temperature power adjustment information with respect to temperature, and said controller determining medium temperature and adjusting said first, second and third power suppliers using the temperature power adjustment information.

6. The magneto-optical drive of claim 4, wherein said memory stores position power adjustment information with respect to the medium position, and said controller moves a laser beam to selective positions on the medium and adjusts the power level of said first, second and third power suppliers using the position power adjustment information.

7. A magneto-optical drive for writing data to a removable magneto-optical medium, comprising:

a bias magnet producing a magnetic field in the medium;

a laser diode producing a laser beam irradiating the medium;

a detector detecting whether the medium is a write-after-erase medium or a direct-over-write medium;

a programmable first power supply for supplying to said laser diode a first power level;

a first switch coupled between said first power supply and said diode, and turned on/off responsive to write data;

a programmable second power supply for supplying to said laser diode a second power level;

a second switch coupled between said laser diode and said second power supply, turned off during a write operation of a write-after-erase medium and turned on during a write operation of a direct-over-write medium;

a programmable third power supply coupled to and supplying to said laser diode a third power level;

a memory storing power adjustment information with respect to temperature and a position of the medium;

a thermometer; and a controller coupled to said first, second and third power supplies, said memory and said thermometer, moving the laser beam to selective positions and setting the power levels of said first, second and third power supplier using the type, the temperature, the position and the power adjustment information, the third power level being a read power level of a tracking operation, the second power level being a difference between the read power level and a first over-write power level during the direct-over-write operation, the first power level being a difference in power level between the read power level and an erase/write power level during an erase-after-write operation, and the first power level being a difference between the first over-write power level and a second over-write power level during the direct-over-write operation with the second over-write power level being higher than the first over-write power level.

* * * * *